(12) United States Patent
Sugae et al.

(10) Patent No.: US 11,249,186 B2
(45) Date of Patent: Feb. 15, 2022

(54) DISTANCE DETECTION APPARATUS AND OBJECT DETECTION APPARATUS

(71) Applicant: AISIN SEIKI KABUSHIKI KAISHA, Kariya (JP)

(72) Inventors: Ippei Sugae, Kariya (JP); Hisashi Inaba, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 4 days.

(21) Appl. No.: 16/683,465

(22) Filed: Nov. 14, 2019

(65) Prior Publication Data

US 2020/0158867 A1 May 21, 2020

(30) Foreign Application Priority Data

Nov. 16, 2018 (JP) .............................. JP2018-215907

(51) Int. Cl.
*G01S 15/10* (2006.01)
*G01S 15/931* (2020.01)

(52) U.S. Cl.
CPC ........... *G01S 15/104* (2013.01); *G01S 15/931* (2013.01); *G01S 2015/938* (2013.01)

(58) Field of Classification Search
CPC ............. G01S 15/104; G01S 2015/938; G01S 15/931; G01S 7/5273

USPC ........................................................ 367/100
See application file for complete search history.

(56) References Cited

U.S. PATENT DOCUMENTS 6,157,592 A * 12/2000 Kriz ........................ G01S 5/186
367/124
2005/0135190 A1 1/2005 Katou et al.

FOREIGN PATENT DOCUMENTS

JP 2005-249770 A 9/2005

* cited by examiner

*Primary Examiner* — Daniel L Murphy
(74) *Attorney, Agent, or Firm* — Sughrue Mion, PLLC

(57) ABSTRACT

A distance detection apparatus includes a wave transmitter configured to transmit a transmission wave, a wave receiver configured to receive the transmission wave which is reflected by an object, a storage portion configured to store a transmission signal, a correlation processing portion configured to obtain a correlation value between the transmission signal and a reception signal corresponding to a reception wave, and a detection portion configured to detect a distance to the obstacle in a case where the correlation value indicates that the transmission signal and the reception signal are similar to each other at a level which is equal to or greater than a predetermined level.

8 Claims, 8 Drawing Sheets

F I G. 2
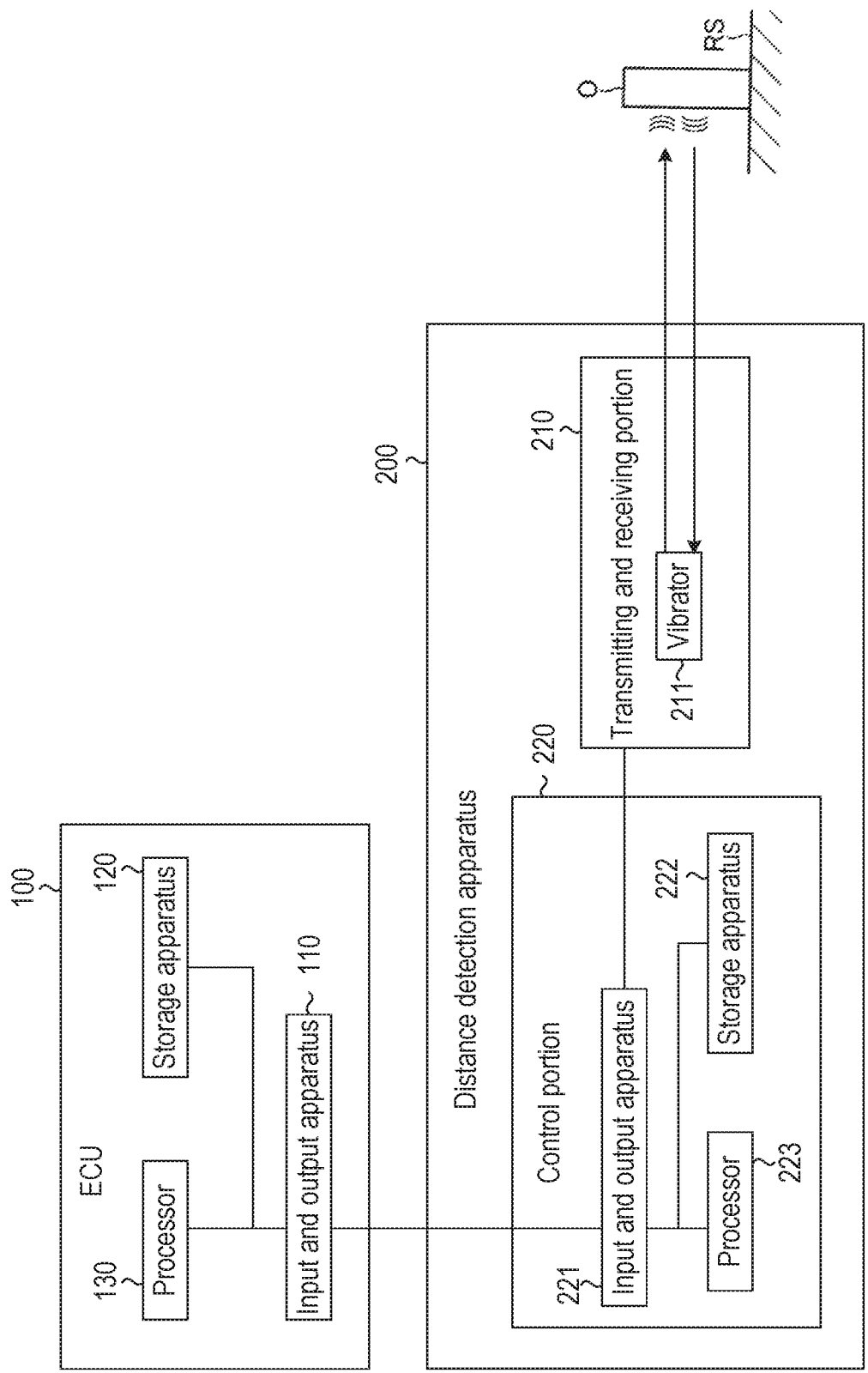

DISTANCE DETECTION APPARATUS AND OBJECT DETECTION APPARATUS

CROSS REFERENCE TO RELATED APPLICATIONS

This application is based on and claims priority under 35 U.S.C. § 119 to Japanese Patent Application 2018-215907, filed on Nov. 16, 2018, the entire content of which is incorporated herein by reference.

TECHNICAL FIELD

This disclosure generally relates to a distance detection apparatus and object detection apparatus.

BACKGROUND DISCUSSION

A technique is conventionally known in which a correlation value between a transmission wave and a reception wave serving as a transmission wave reflected by an object and returned is obtained (calculated), and it is determined whether or not a degree of similarity of the transmission wave and the reception wave to each other is at a level which is equal to or greater than a predetermined level on the basis of the correlation value. In accordance with the determination result, a distance to the object is detected as one of informations related to the object by using TOF (Time Of Flight) method, for example (for example, JP2005-249770A which will be referred also to Patent reference 1).

Generally, in the above-described known technique, a tuning circuit for tuning the transmission wave and the reception wave with each other needs to be provided to obtain an accurate correlation value, and accordingly a circuit configuration might be complicated.

A need thus exists for a distance detection apparatus and object detection apparatus which are not susceptible to the drawback mentioned above.

SUMMARY

According to an aspect of this disclosure, a distance detection apparatus includes a wave transmitter configured to transmit a transmission wave corresponding to a transmission signal, a wave receiver configured to receive, as a reception wave, the transmission wave which is reflected by an object, a storage portion configured to store the transmission signal, a correlation processing portion configured to obtain a correlation value between the transmission signal read from the storage portion and a reception signal corresponding to the reception wave, and a detection portion configured to detect a distance from the distance detection apparatus to the object on the basis of a difference between a timing at which the transmission wave is transmitted and a timing at which the reception signal is received, the detection portion detects the distance in a case where the correlation value indicates that the transmission signal and the reception signal are similar to each other at a level which is equal to or greater than a predetermined level.

According to another aspect of this disclosure, an object detection apparatus includes a wave transmitter configured to transmit a transmission wave corresponding to a transmission signal, a wave receiver configured to receive, as a reception wave, the transmission wave which is reflected by an object, a storage portion configured to store the transmission signal, a correlation processing portion configured to obtain a correlation value between the transmission signal read from the storage portion and a reception signal corresponding to the reception wave, and a detection portion configured to detect information related to the object on the basis of the correlation value.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a schematic block diagram illustrating a schematic hardware configuration of an ECU (Electronic Control Unit) and a distance detection apparatus, according to the embodiment;

DETAILED DESCRIPTION

An embodiment of the present disclosure will be described with reference to the drawings. The configuration of the embodiment described hereafter, and the operations and results (advantages and effects) brought by the configuration are examples, and the present disclosure is not limited thereto.

Figure 1:
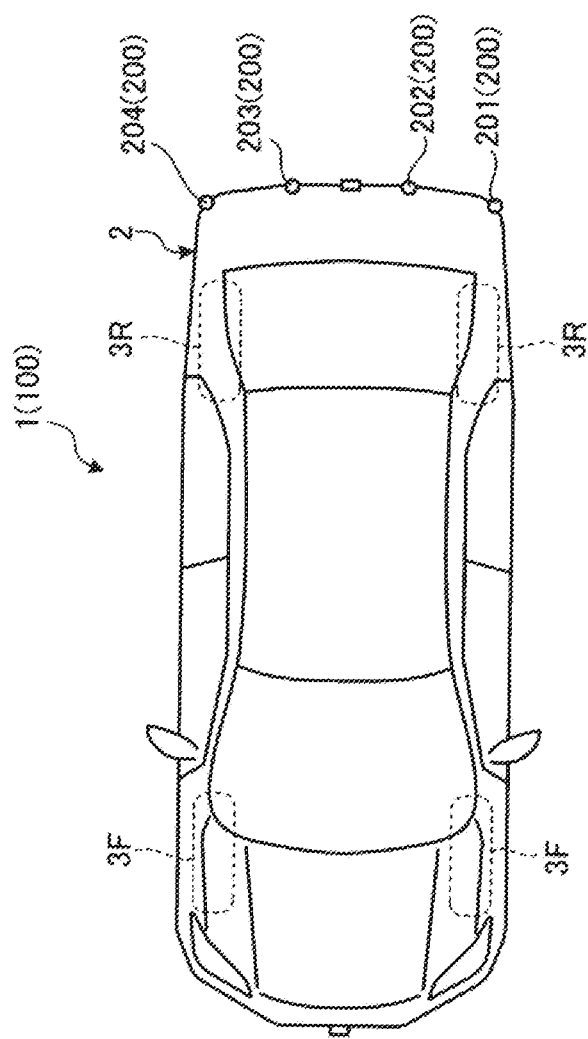
FIG. 1 is a schematic view, seen from above, illustrating an exterior of a vehicle provided with an object detection system according to an embodiment disclosed here.

FIG. 1 is a schematic example view, seen from above, illustrating an exterior of a vehicle provided with an object detection system according to the embodiment. As will be described in detail later, the object detection system according to the embodiment is a sensor system that performs transmission and reception of ultrasonic waves and obtains, for example, a time difference between the transmission and reception, and thereby detecting information related to an object including a human or person in the surroundings (for example, an obstacle O illustrated in FIG. 2 which will be described later).

As illustrated in FIG. 1, the object detection system includes an ECU (Electronic Control Unit) 100 (refer also to FIG. 2 which will be described in detail below) provided inside the vehicle 1, and distance detection apparatuses 201, 202, 203, 204 provided at an exterior of the vehicle 1. The vehicle 1 is provided with four wheels including a pair of front wheels 3F and a pair of rear wheels 3R.

As an example, in the example illustrated in FIG. 1, the distance detection apparatuses 201 to 204 are provided at, for example, a rear bumper at a rear end of a vehicle body 2 serving as the exterior of the vehicle 1, so as to be arranged at different positions from one another.

In the embodiment, hardware configurations and functions of the respective distance detection apparatuses 201, 202, 203, 204 are identical to one another. Therefore, for the purpose of simplification, the distance detection apparatuses 201, 202, 203, 204 will be collectively referred to also as the distance detection apparatus 200 hereunder.

In the embodiment, the position where the distance detection apparatus 200 is arranged is not limited to the example illustrated in FIG. 1. For example, the distance detection apparatus 200 may be provided at a front bumper of a front end of the vehicle body 2, at a side surface or side surfaces of the vehicle body 2, or at two or more positions of the rear bumper, the front bumper and the side surfaces. In the embodiment, the number of the distance detection apparatus 200 is not limited to the example illustrated in FIG. 1.

FIG. 2 is a schematic example block diagram illustrating a hardware configuration of the ECU 100 and the distance detection apparatus 200, according to the embodiment.

As illustrated in FIG. 2, the ECU 100 includes the hardware configuration that is similar to a usual computer. More specifically, the ECU 100 includes an input and output apparatus 110, a storage apparatus 120 and a processor 130.

The input and output apparatus 110 is an interface for realizing transmission and reception of information between the ECU 100 and an outside (the distance detection apparatus 200 in the example of FIG. 1).

The storage apparatus 120 includes a main storage including ROM (Read Only Memory) and/or RAM (Random Access Memory), and/or an auxiliary storage including an HDD (Hard Disk Drive) and/or an SSD (Solid State Drive), for example.

The processor 130 controls various processing executed in the ECU 100. The processor 130 includes an arithmetic apparatus including a CPU (Central Processing Unit), for example. For example, the processor 130 realizes various functions including autonomous or automatic parking by reading a computer program stored in the storage apparatus 120 and performing the computer program.

As illustrated in FIG. 2, the distance detection apparatus 200 includes a transmitting and receiving portion 210 and a control portion 220.

The transmitting and receiving portion 210 includes a vibrator 211 including, for example, a piezoelectric element, and realizes the transmission and reception of the ultrasonic waves with the use of the vibrator 211.

More specifically, the transmitting and receiving portion 210 transmits, as a transmission wave, an ultrasonic wave generated in response to vibrations of the vibrator 211. Then, the transmitting and receiving portion 210 receives, as a reception wave, vibrations of the vibrator 211, the vibrations which are caused in a manner that the ultrasonic wave transmitted as the transmission wave is reflected by an object existing in the outside and the reflected wave returns. In the example of FIG. 2, the obstacle O arranged on a road surface RS is illustrated as the object that reflects the ultrasonic wave from the transmitting and receiving portion 210.

According to the configuration of the example illustrated in FIG. 2, both the transmission of the transmission wave and the reception of the reception wave are realized or performed by the single transmitting and receiving portion 210 provided with the single vibrator 211. However, the technique of the embodiment is also applicable to a configuration in which a configuration of a transmitting-side and a configuration of a receiving-side are separated from each other, including a configuration in which a first vibrator for transmitting the transmission wave and a second vibrator for receiving the reception wave are provided separately from each other, for example.

The control portion 220 includes a hardware configuration that is similar to a usual computer. More specifically, the control portion 220 includes an input and output apparatus 221, a storage apparatus 222 and a processor 223.

The input and output apparatus 221 is an interface for realizing transmission and reception of information between the control portion 220 and an outside (the ECU 100 and the transmitting and receiving portion 210 in the example of FIG. 1).

The storage apparatus 222 includes a main storage including ROM and/or RAM, and/or an auxiliary storage including an HDD and/or an SSD, for example.

The processor 223 controls various processing executed in the control portion 220. The processor 223 includes an arithmetic apparatus including a CPU, for example. For example, the processor 223 realizes various functions by reading a computer program stored in the storage apparatus 222 and then performing the computer program.

The distance detection apparatus 200 of the embodiment detects a distance to the object with the use of the technology of so-called TOF (Time Of Flight) method. As will be described in detail below, the TOF method is the technique that a distance to an object is calculated in consideration of a difference between a timing at which a transmission wave was transmitted (more specifically, a timing at which the transmission of the transmission wave was started) and a timing at which a reception wave was received (more specifically, a timing at which the reception of the reception wave was started).

Figure 3:
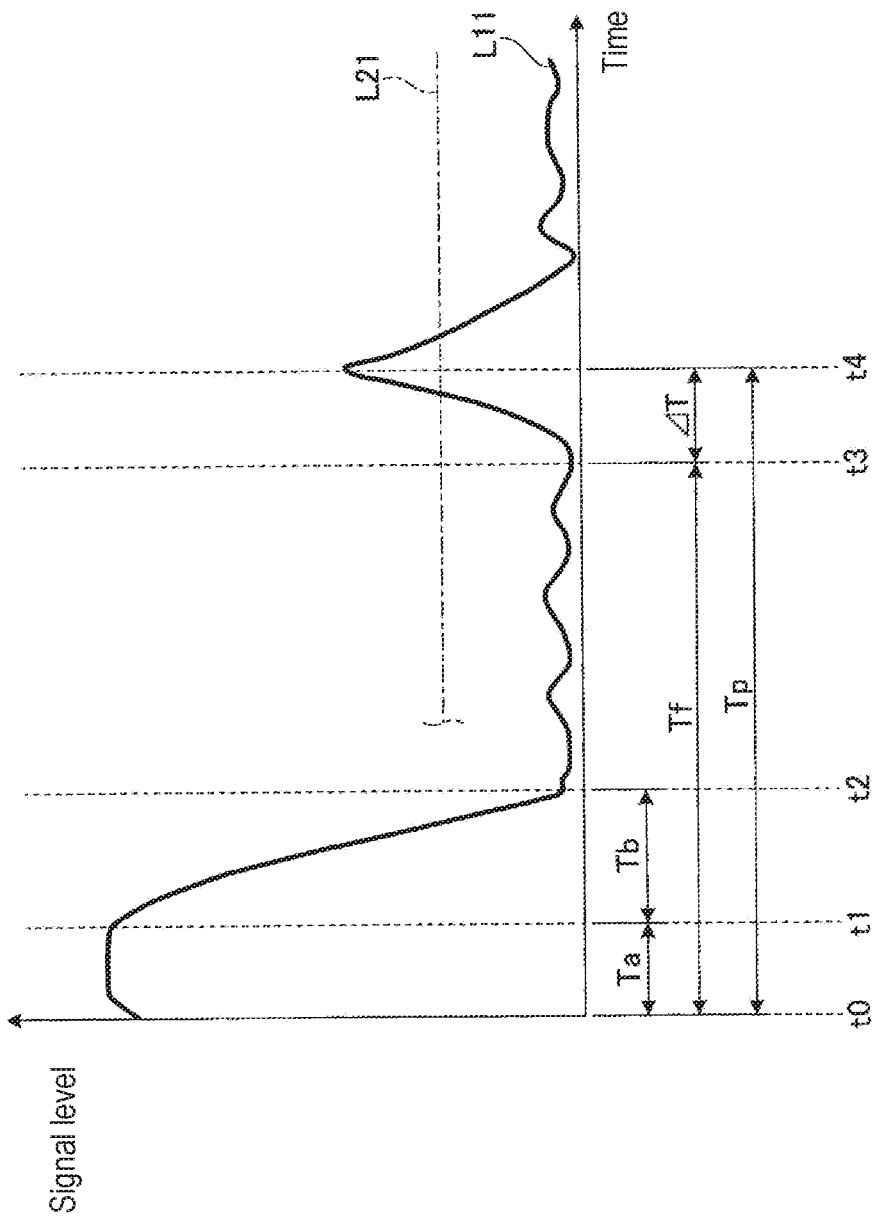
FIG. 3 is a schematic view for explaining an outline of a technique used by the distance detection apparatus according to the embodiment for detecting a distance to an object.

FIG. 3 is a schematic example view for explaining an outline of a technique used by the distance detection apparatus 200 to detect the distance to the object, according to the embodiment. More specifically, FIG. 3 is a view schematically illustrating, in a graphic form, a time change of a signal level (amplitude, for example) of the ultrasonic wave transmitted and received by the distance detection apparatus 200. In the graph illustrated in FIG. 3, the horizontal axis corresponds to the time and the vertical axis corresponds to the signal level of the signal transmitted and received by the distance detection apparatus 200 via the transmitting and receiving portion 210 (the vibrator 211).

In the graph illustrated in FIG. 3, a solid line L11 indicates an example of the signal level of the signal that the distance detection apparatus 200 transmits or receives, that is, an envelope curve indicating the time change (the change over time) of a degree of vibration of the vibrator 211. It can be read from the solid line L11 that the vibrator 211 is driven and vibrates from a timing t0 for a time Ta and thus the transmission of the transmission wave is completed at a timing t1, and thereafter, the vibrator 211 keeps vibrating due to inertia for a time Tb until reaching a timing t2 while the vibration becomes attenuated or damped. Accordingly, in the graph illustrated in FIG. 3, the time Tb corresponds to so-called reverberation time.

The solid line L11 comes to a peak at a timing t4 when a time Tp has passed since the transmission of the transmission wave started at the timing t0. At the peak, the degree of vibration of the vibrator 211 exceeds (or, equals to or greater than) a predetermined threshold value Th1 indicated by an alternate long and short dash line L21. The predetermined threshold value Th1 is a value set in advance to identify or distinguish whether the vibration of the vibrator 211 results from the reception of the reception wave corresponding to the transmission wave that has been reflected by a detection target object (the object which is a target of the detection, including, the obstacle O illustrated in FIG. 2, for example) and then has returned, or the vibration of the vibrator 211 results from the reception of the reception wave corresponding to the transmission wave that has been reflected by the object which is other than the detection target object (the road surface RS illustrated in FIG. 2, for example) and then has returned.

FIG. 3 illustrates an example where the predetermined threshold value Th1 is set as a constant value that does not change or vary with time, however, the predetermined threshold value Th1 may be set as a value that changes with time in the embodiment.

Here, it can be regarded that the vibration of which the peak exceeds (or, is equal to or greater than) the predetermined threshold value Th1 results from the reception of the reception wave corresponding to the transmission wave that has been reflected by the object which is the target of the detection and then returned. On the other hand, it can be regarded that the vibration of which the peak is equal to or less than (or, is less than) the predetermined threshold value Th1 results from the reception of the reception wave corresponding to the transmission wave that has been reflected by the object which is other than the target of the detection and then returned.

Consequently, it can be read from the solid line L11 that the vibration of the vibrator 211 at the timing t4 is caused by the reception of the reception wave corresponding to the transmission wave that has been reflected by the detection target object and then returned.

According to the solid line L11, the vibration of the vibrator 211 is attenuated at and after the timing t4. Thus, the timing t4 corresponds to a timing at which the reception of the reception wave serving as the transmission wave that has been reflected by the detection target object and returned is completed, in other words, the timing t4 corresponds to a timing at which the last transmission wave that was transmitted lastly at the timing t1 returns as the reception wave.

According to the solid line L11, a timing t3 serving as a start point of the peak of the timing t4 corresponds to a timing at which the reception of the reception wave corresponding to the transmission wave that has been reflected by the detection target object and then returned is started, in other words, the timing t3 corresponds to a timing at which the first transmission wave that was firstly transmitted at the timing t0 returns as the reception wave. Consequently, according to the solid line L11, a time ΔT from the timing t3 to the timing t4 is equal to the time Ta serving as a transmission time of the transmission wave.

In the light of the above description, in order to obtain the distance to the object that is the target of the detection with the use of the TOF method, a time Tf from the timing t0 at which the transmission wave started being transmitted and the timing t3 at which the reception wave started being received needs to be obtained. The time Tf can be obtained by subtracting the time ΔT that equals to the time Ta corresponding to the transmission time of the transmission wave, from the time Tp corresponding to a difference between the timing t0 and the timing t4 at which the signal level of the reception wave comes to the peak exceeding the threshold value Th1.

The timing t0 at which the transmission wave starts being transmitted is easily identified as a timing at which the distance detection apparatus 200 started operating. The time Ta corresponding to the transmission time of the transmission wave is predetermined by, for example, setting in advance. Accordingly, for obtaining the distance to the object of the detection target by the TOF method, it is important to identify the timing t4 at which the signal level of the reception wave reaches the peak exceeding the threshold value Th1.

A conventionally known technique is to obtain (calculate) a correlation value corresponding to a degree of similarity of the transmission wave and the reception wave to each other, to determine whether or not the degree of similarity is at a level which is equal to or greater than a predetermined level on the basis of a comparison result comparing the correlation value to a predetermined threshold value, and to identify a timing at which the degree of similarity is determined to be equal to or greater than the predetermined level as the timing t4 at which the reception wave reaches the peak exceeding the threshold value Th1. The correlation value is a value that reaches the peak in a case where a wave form of the transmission wave and a wave form of the reception wave are similar to each other (coincide with each other) at the level that is equal to or greater than the predetermined level. The correlation value is calculated on the basis of an autocorrelation function that is commonly well-known, for example.

In the above-described conventionally known technique, a tuning circuit for tuning the transmission wave and the reception wave to each other usually needs to be provided inside the distance detection apparatus 200 such that an accurate correlation value is obtained, and thus the circuit configuration may be complicated.

In the embodiment, the distance detection apparatus 200 is configured as follows, and thus the accurate correlation value between the transmission wave and the reception wave is obtained with a simpler circuit configuration.

Figure 4:
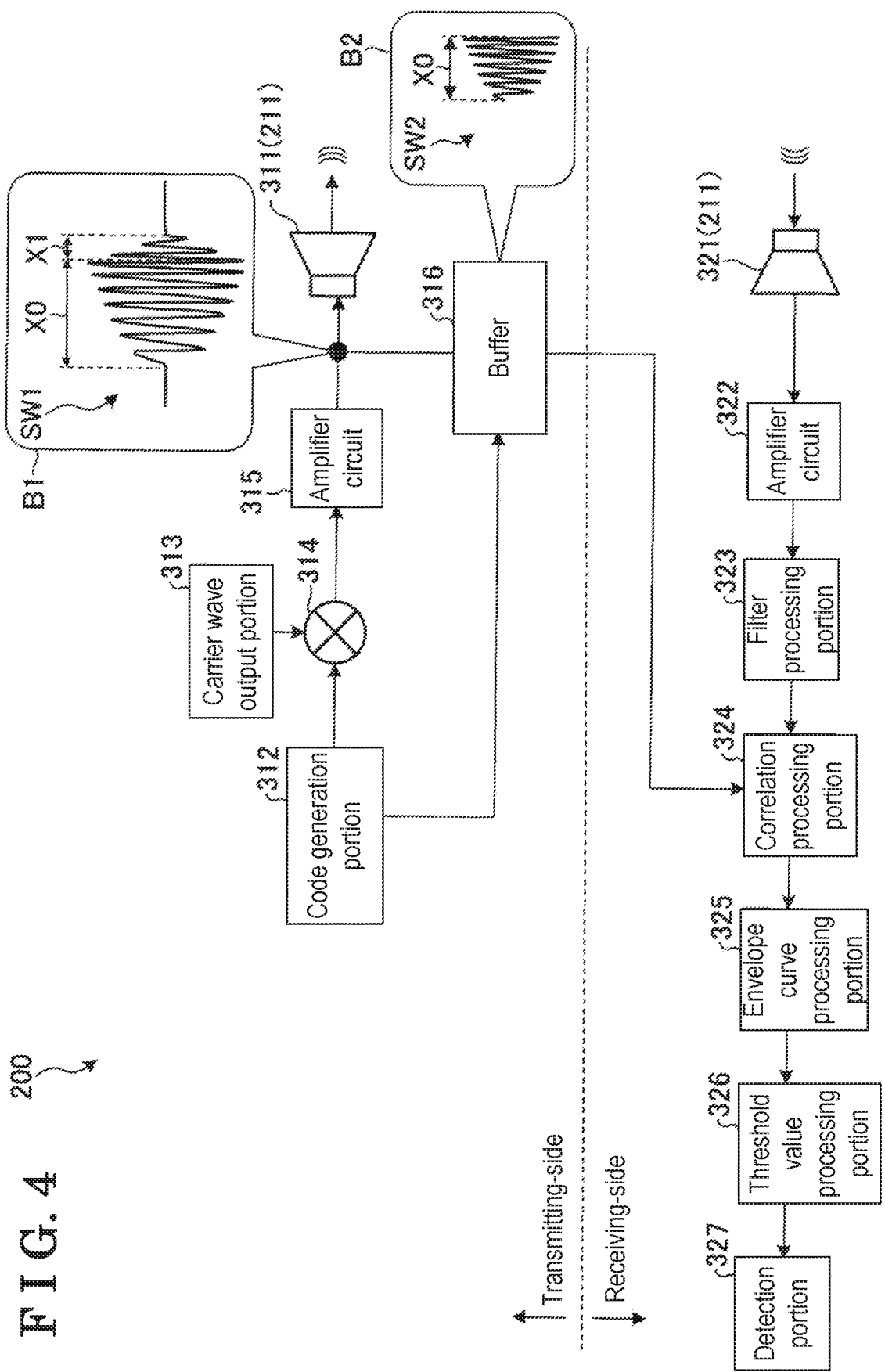
FIG. 4 is a schematic block diagram illustrating a detailed configuration of the distance detection apparatus according to the embodiment.

FIG. 4 is a schematic example block diagram illustrating a detailed configuration of the distance detection apparatus 200 according to the embodiment. In the example illustrated in FIG. 4, a configuration of the transmitting-side and a configuration of the receiving-side are separated from each other, however, the manner illustrated in FIG. 4 is intended to be for convenience of the explanation. As described above, in the embodiment, both of the transmission of the transmission wave and the reception of the reception wave are realized by the (single) transmitting and receiving portion 210 including the (single) vibrator 211. However, as described above, the technique of the embodiment is applicable to the configuration in which the configuration of the transmitting-side and the configuration of the receiving-side are separated from each other.

As illustrated in FIG. 4, the distance detection apparatus 200 includes a wave transmitter 311, a code generation portion 312, a carrier wave output portion 313, a multiplier 314, an amplifier circuit 315 and a buffer 316 (i.e., a storage portion), as the configuration of the transmitting-side. The distance detection apparatus 200 includes a wave receiver 321, an amplifier circuit 322, a filter processing portion 323, a correlation processing portion 324, an envelope curve processing portion 325, a threshold value processing portion 326 and a detection portion 327, as the configuration of the receiving-side.

In the example illustrated in FIG. 4, the buffer 316 may be provided at the receiving-side instead of at the transmitting-side. Part of the configuration illustrated in FIG. 4 may be realized by an exclusive hardware (an analog circuit). Other part of the remaining configuration may be realized as a result of cooperation of hardware and software with each other, more specifically, as a result that the processor 223 of the control portion 220 reads out the computer program from the storage apparatus 222 of the control portion 220 and performs the computer program.

First, the configuration of the transmitting-side will be described briefly.

The wave transmitter 311 is configured of the vibrator 211, and transmits the transmission wave corresponding to a transmission signal outputted from the amplifier circuit 315 (that is, an amplified transmission signal) by the vibrator 211. As will be described below, in the embodiment, a coded signal, which is generated by applying or giving identification information including a predetermined code length to the carrier wave, is outputted as the transmission signal serving as a base or basis of the transmission wave.

The code generation portion 312 generates a signal (a pulse signal) corresponding to a code of a bit sequence formed of a series of bits of 0 or 1, for example. A length of the bit sequence corresponds to the code length of the identification information given to the transmission signal.

The carrier wave output portion 313 outputs the carrier wave serving as a signal to which the identification information is given. For example, the carrier wave is configured as a sine wave including an arbitrary frequency.

The multiplier 314 performs the tuning of the carrier wave such that the identification information is given, by multiplying output from the code generation portion 312 and output from the carrier wave output portion 313 by each other. Then, the multiplier 314 outputs, to the amplifier circuit 315, the carrier wave after the tuning to which the identification information has been given, as the transmission signal serving as the basis of the transmission wave. As a method of the tuning, any one of generally well-known tuning methods including an amplitude modulation method, a phase modulation method and a frequency modulation method, or a combination of two or more of the above-stated methods can be used, for example.

In the embodiment, a combination of the code generation portion 312, the carrier wave output portion 313 and the multiplier 314 functions as a transmission signal output portion. The transmission signal output portion outputs, to a side of the wave transmitter 311, the coded signal generated by providing the identification information including the predetermined code length to the carrier wave. The coded signal is outputted as the transmission signal serving as the basis of the transmission wave. The identification information is not normally lost due to the reflection. On the basis of the identification information, therefore, the similarity of the transmission signal and the reception signal, which corresponds to the reception wave received in a manner that the transmission wave corresponding to the transmission signal returns due to the reflection, can be determined more easily and/or more reliably.

The amplifier circuit 315 amplifies the transmission signal outputted from the multiplier 314 and outputs the amplified transmission signal to the wave transmitter 311.

The buffer 316 temporarily stores therein (at least part of) the amplified transmission signal amplified by the amplifier circuit 315. The role of the buffer 316 will be described in detail later. In the embodiment, as a storage portion configured to store the transmission signal, a configuration which stores the transmission signal in a non-temporal manner may be provided instead of the buffer 316 storing the transmission signal in the temporal manner.

Next, the configuration of the receiving-side will be described briefly.

The wave receiver 321 is configured of the vibrator 211, and receives by the vibrator 211 the transmission wave reflected by the object, as the reception wave. The transmission wave includes the identification information as described above, and thus the reception wave also includes the similar identification information.

The amplifier circuit 322 amplifies the reception signal serving as a signal corresponding to the reception wave that the wave receiver 321 receives.

The filter processing portion 323 performs filtering processing on a reception signal that has been amplified by the amplifier circuit 322 and suppresses noises. In the embodiment, the filter processing portion 323 may obtain information related to a frequency of the transmission signal stored in the buffer 316 and further correct a frequency of the reception signal so that the frequency of the reception signal matches the frequency of the transmission signal.

The correlation processing portion 324 obtains the above-described correlation value corresponding to the degree of similarity of the transmission wave and the reception wave to each other. More specifically, the correlation processing portion 324 obtains the correlation value of the transmission signal read out from the buffer 316 and the reception signal outputted via the filter processing portion 323 with each other. As described above, the correlation value is calculated according to a commonly well-known correlation function, for example.

Here, a configuration which excludes the buffer 316 from the configuration illustrated in FIG. 4 is hypothetically considered. In order to obtain an accurate correlation value in the configuration that does not include the buffer 316, for example, a multiplier serving as the tuning circuit for tuning the transmission signal and the reception signal to each other needs to be additionally provided before the correlation processing portion 324, as explained in the above-described conventionally known technique. In the additionally-provided multiplier, each of the transmission signal and the reception signal is multiplied by a carrier wave including the same frequency such that the transmission signal and the reception signal are tuned to each other.

To the contrary, the transmission signal is stored in the buffer 316 in the embodiment, and thus the transmission signal read out from the buffer 316 and the reception signal inputted in accordance with the reception wave are used as they are without the need to consider the tuning of the transmission signal and the reception signal to each other, and the accurate correlation value is obtained. Consequently, there is no need to provide, for example, the tuning circuit for tuning the transmission signal and the reception signal to each other, and thus the circuit configuration may be simplified in the embodiment.

The envelope curve processing portion 325 obtains the envelope curve of the wave form of the signal corresponding to the correlation value obtained by the correlation processing portion 324.

The threshold value processing portion 326 compares a value of the envelope curve obtained by the envelope curve processing portion 325 and the predetermined threshold value to each other.

The detection portion 327 identifies, on the basis of a comparison result by the threshold value processing portion 326, the timing (the timing t4 indicated in FIG. 3) at which the signal level of the reception wave reaches the peak exceeding the threshold value, and detects the distance to the object from the distance detection apparatus by the TOF method.

In the embodiment, as described above, the buffer 316 stores the amplified transmission signal after being amplified by the amplifier circuit 315. However, the amplified transmission signal may include amplification noise. For example, in the example illustrated in FIG. 4, as indicated by a signal waveform SW1 in a balloon B1, the amplified transmission signal includes a section X1 which corresponds to the amplification noise and which appears after a section X0 corresponding to an output time period of the transmission signal. The section X1 is the noise in obtaining (calculating) the correlation value, and thus is ideally eliminated from the transmission signal to be inputted to the correlation processing portion 324 as grounds of the correlation value.

Accordingly, in the embodiment, the buffer 316 stores only a portion of the amplified transmission signal, the portion which corresponds to the output time period of the transmission signal. The buffer 316 stores the above-described portion of the amplified transmission signal on the basis of information which is obtained from, for example, the code generation portion 312 serving as the transmission signal output portion and which is related to a timing at which the transmission signal is outputted. For example, in the example illustrated in FIG. 4, the buffer 316 stores the transmission signal including a signal waveform SW2 indicated in a balloon B2 in such a manner that only the section X0 corresponding to the output time period of the transmission signal is extracted from the signal waveform SW1 indicated in the balloon B1, on the basis of the information obtained from the code generation portion 312.

As described above, in the embodiment, even in a case where the amplification noise is added to the transmission signal, the transmission signal to be inputted into the correlation processing portion 324 as the grounds for the correlation value includes only the section X0 corresponding to the output time period and excludes the section X1 corresponding to the amplification noise.

In the embodiment, each of the above-described configurations of the distance detection apparatus 200 may operate under the control of the control portion 220 of the distance detection apparatus 200, and/or may operate under the control of the ECU 100 outside.

Figure 5:
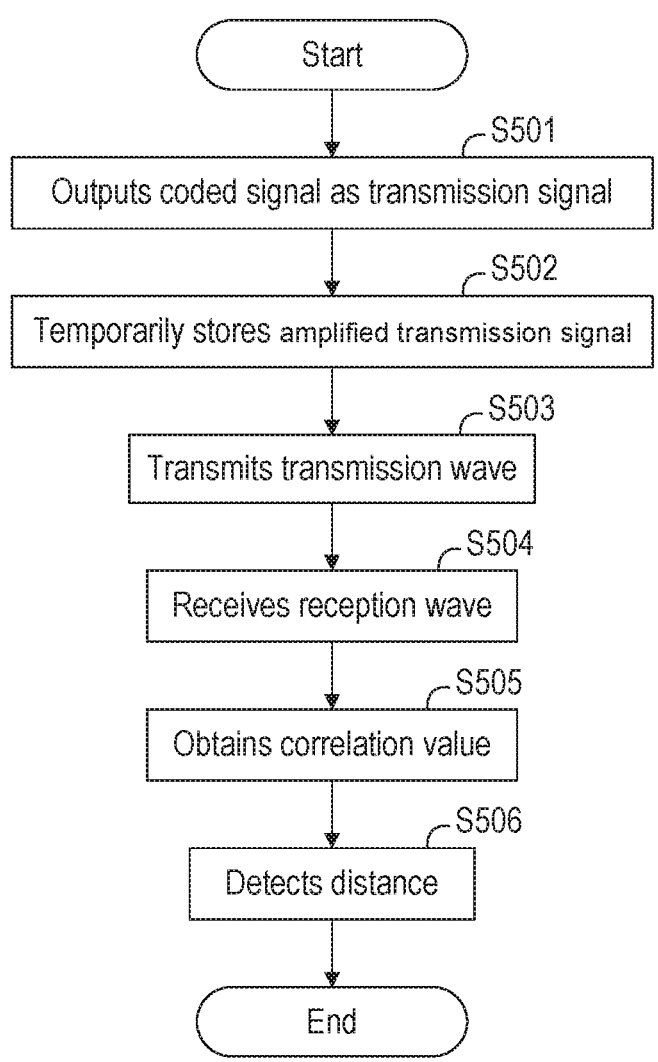
FIG. 5 is a schematic flowchart indicating a flow of operations of the distance detection apparatus according to the embodiment.

The distance detection apparatus 200 of the embodiment operates in accordance with a flow illustrated in FIG. 5.

FIG. 5 is a schematic example flowchart indicating the flow of operations of the distance detection As illustrated in FIG. 5, first, at S501, the transmission signal output portion (the code generation portion 312, the carrier wave output portion 313 and the multiplier 314) of the embodiment outputs the coded signal as the transmission signal that is the base of the transmission wave. The coded signal is generated in a manner that the identification information including the predetermined code length is added to or given to the carrier wave. The transmission signal is amplified by the amplifier circuit 315 and is thereafter outputted to the wave transmitter 311.

At S502, the buffer 316 temporarily stores the amplified transmission signal that is generated by the amplifier circuit 315 by amplifying the transmission signal after the transmission signal is outputted at S501. At this time, as described above, the buffer 316 temporarily stores the amplified transmission signal only by the portion corresponding to the output time period of the transmission signal, on the basis of the information obtained from, for example, the code generation portion 312 of the transmission signal output portion.

At S503, the wave transmitter 311 transmits, towards outside the vehicle 1, the transmission wave corresponding to the transmission signal outputted at S501.

At S504, the wave receiver 321 receives the reception wave corresponding to the transmission wave that was reflected by the object existing outside the vehicle 1 and consequently returns to the vehicle side.

At S505, the correlation processing portion 324 obtains (calculates) the correlation value between the transmission signal read from the buffer 316 (the transmission signal stored in the buffer 316 at S502) and the reception signal corresponding to the reception wave received at S504 (the reception signal that has undergone the amplification by the amplifier circuit 322 and the noise suppression by the filter processing portion 323) with each other.

At S506, the detection portion 327 detects the distance to the object that has reflected the transmission wave on the basis of the correlation value obtained at S505. More specifically, first, the detection portion 327 obtains, from the threshold value processing portion 326, the comparison result of the correlation value that has undergone the processing by the envelope curve processing portion 325 and the threshold value to each other. Then, on the basis of the information obtained from the threshold value processing portion 326, the detection portion 327 identifies the timing at which the transmission wave was transmitted and the timing at which the reception wave which is similar to (coincides with) the transmission wave at the level equal to or greater than the predetermined level was received. On the basis of the difference between the above-described two timings, the detection portion 327 obtains (calculates) the distance to the object that has reflected the transmission wave, by the TOF method. Then, the process ends.

As described above, the distance detection apparatus 200 of the embodiment includes at least the code generation portion 312, the carrier wave output portion 313, the multiplier 314, the wave transmitter 311, the wave receiver 321, the buffer 316, the correlation processing portion 324 and the detection portion 327. The code generation portion 312, the carrier wave output portion 313 and the multiplier 314 function as the transmission signal output portion outputting the transmission to a side of the wave transmitter 311. The wave transmitter 311 transmits the transmission wave corresponding to the transmission signal. The wave receiver 321 receives, as the reception wave, the transmission wave reflected by the object. The buffer 316 functions as the storage portion storing therein the transmission signal. The correlation processing portion 324 obtains the correlation value between the transmission signal read out from the buffer 316 and the reception signal corresponding to the reception wave. In a case where the correlation value indicates that the transmission signal and the reception signal are similar to each other at the predetermined level or higher, the detection portion 327 detects the distance to the object on the basis of the difference between the timing at which the transmission wave was transmitted and the timing at which the reception wave was received.

According to the above-described configuration, by storing the transmission signal at the buffer 316, the transmission signal read out from the buffer 316 and the reception signal inputted in accordance with the reception wave are used as they are to obtain an accurate correlation value without the need to consider the tuning of the transmission signal and the reception signal to each other. Consequently, there is no need to provide, for example, the tuning circuit for tuning the transmission signal and the reception signal to each other, and thus the circuit configuration may be simplified.

In the embodiment, the distance detection apparatus 200 includes the amplifier circuit 315 amplifying the transmission signal and then outputting the amplified transmission signal to the wave transmitter, and the buffer 316 stores the amplified transmission signal amplified by the amplifier circuit 315. According to the configuration, unlike a case in which for example the transmission signal before the amplification is stored, the transmission signal before being transmitted as the transmission wave can be stored more accurately.

In the embodiment, the buffer 316 stores only the portion of the amplified transmission signal, the portion which corresponds to the output time period of the transmission signal, on the basis of the information related to the timing at which the transmission signal is outputted and which is obtained from, for example, the code generation portion 312 of the transmission signal output portion. According to the configuration, even in a case where the amplification noise is added to the transmission signal, the transmission signal stored in the buffer 316 as the grounds of the correlation value does not include the section X1 (refer to FIG. 4) corresponding to the amplification noise and includes only the section X0 (refer to FIG. 4) corresponding to the output time period. Consequently, the correlation value is obtained more accurately.

In the embodiment, the transmission signal output portion that is a combination of the code generation portion 312, the carrier wave output portion 313 and the multiplier 314 outputs, as the transmission signal, the coded signal generated by adding the identification information including the predetermined code length to the carrier wave. According to the configuration, distinguishability of the transmission signal may be enhanced due to the identification information.

In the embodiment, the wave transmitter 311 and the wave receiver 321 are formed integrally with each other as the transmitting and receiving portion 210 including the single vibrator 211 that can transmit and receive the ultrasonic wave. According to the structure, the configuration of the distance detection apparatus 200 may be simplified.

In the embodiment, the storage or memory of the transmission signal is realized by the buffer 316 storing the transmission signal temporarily. According to the configuration, a storage capacity can be reduced compared to a case in which, for example, the transmission signal is stored in a non-temporary manner.

(Variations) In the above-described embodiment, the disclosed technique is described to be applicable to the distance detection apparatus detecting the distance to the object, however, the disclosed technique is widely applicable to other subject than the distance detection apparatus, other subject including an object detection apparatus detecting information related to an object on the basis of the correlation value between the transmission signal and the reception signal. For example, the technique disclosed here is applicable to the object detection apparatus detecting only whether or not the object exists, that is, the presence or absence of the object, which serves as the information related to the object.

That is, the disclosed technique is applicable to the object detection apparatus including the wave transmitter transmitting the transmission wave corresponding to the transmission signal, the wave receiver receiving, as the reception wave, the transmission wave having been reflected by the object, the storage portion storing the transmission signal, the correlation processing portion obtaining the correlation value between the transmission signal read from the storage portion and the reception signal corresponding to the reception wave, and detection portion detecting the information related to the object on the basis of the correlation value.

In the above-described embodiment, the transmission signal is configured as the coded signal, however, the disclosed technique is applicable to a case in which the transmission signal is configured as a signal which is not coded.

In the above-described embodiment, the technique of the disclosure is applied to the configuration transmitting and receiving the ultrasonic wave, however, the disclosure is applicable to a configuration transmitting and receiving a sound wave, a millimeter wave and/or an electromagnetic wave other than the ultrasonic wave.

In the above-described embodiment, the distance detection apparatus including one each of the configuration of the transmitting-side and the configuration of the receiving-side is illustrated as the example (refer to FIG. 4). However, the technique of the disclosure assumes and envisages a distance detection system 600 including plural configurations of the transmitting-side and plural configurations of the receiving-side as illustrated in FIG. 6.

Figure 6:
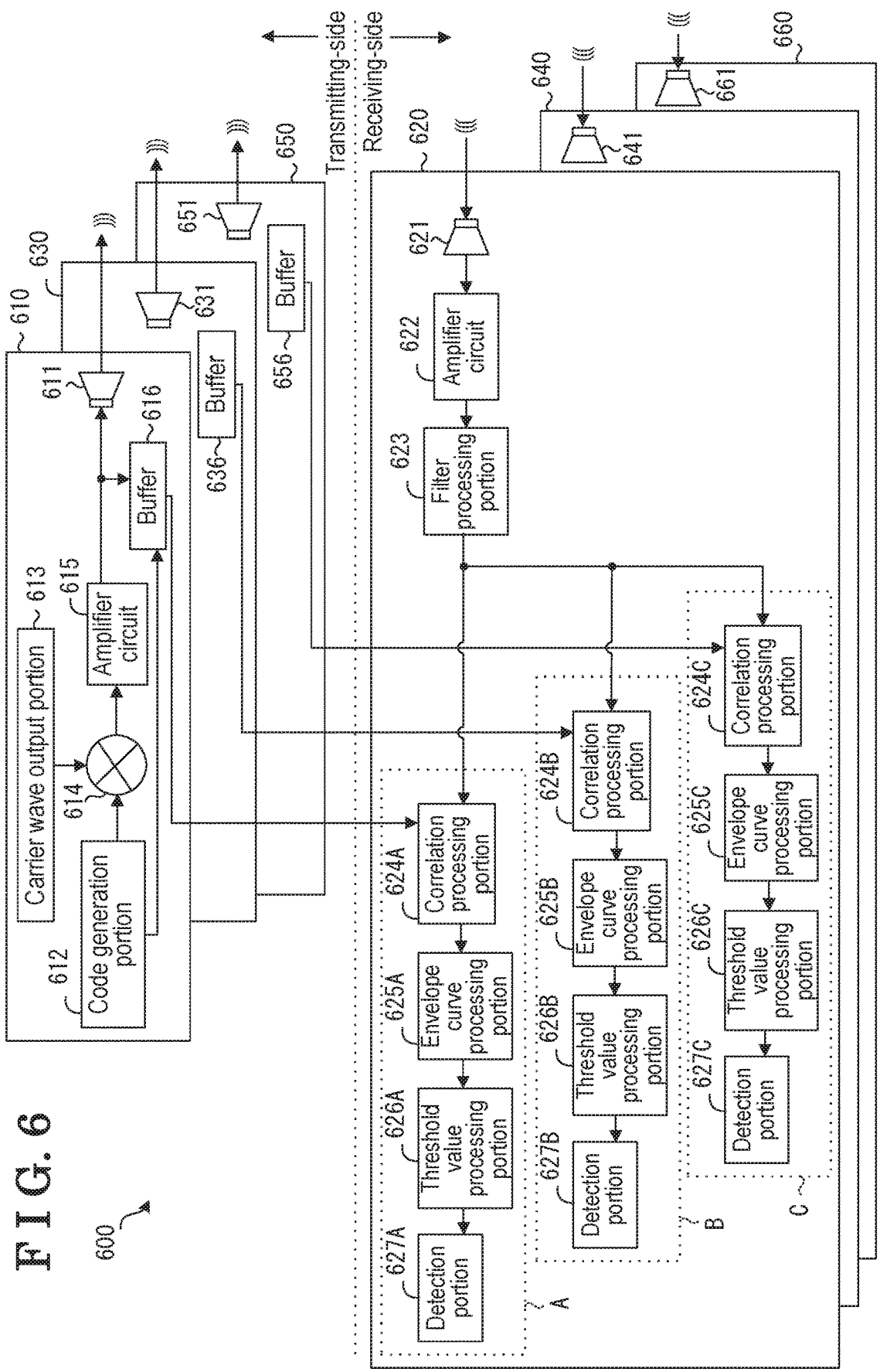
FIG. 6 is a schematic block diagram illustrating a detailed configuration of a distance detection system according to a first modified example of the embodiment.

FIG. 6 is a schematic example block diagram illustrating a detailed configuration of the distance detection system 600 according to a first modified example of the embodiment. As illustrated in FIG. 6, the distance detection system 600 according to the first modified example includes three transmitting portions 610, 630, 650 serving as the configuration of the transmitting-side, and three receiving portions 620, 640, 660 serving as the configuration of the receiving-side. The distance detection system 600 is an example of "the distance detection apparatus".

In the first modified example, the transmitting portion 610 includes a wave transmitter 611, the transmission signal output portion (a combination of a code generation portion 612, a carrier wave output portion 613 and a multiplier 614), an amplifier circuit 615 and a buffer 616 (i.e., a storage portion). The functions and operations of these configurations are substantially similar to the functions and operations of the configuration of the transmitting-side of the distance detection apparatus 200 (refer to FIG. 4, for example) according to the above-described embodiment, and therefore further explanation is omitted.

The drawing is a schematic diagram, however, each of the transmitting portions 630 and 650 includes the configuration that is similar to the configuration of the transmitting portion 610, including the transmission signal output portion, for example.

In the first modified example, the transmitting portions 610, 630, 650 transmit the respective transmission waves corresponding to the transmission signals serving as the coded signals to which different identification informations from one another are given, and thus the transmitting portions 610, 630, 650 are configured to prevent the transmission waves from being confused with one another. The transmitting portions 610, 630 and 650 include buffers 616, 636 and 656 (i.e., storage portions), respectively, serving as the storage portions storing the respective transmission signals temporarily.

That is, in the first modified example, plural (three, for example) combinations of the transmission signal output portion and the wave transmitter are provided, where the identification informations differ from one another. In the first modified example, plural of the storage portions each of which temporarily stores the transmission signal are provided, and the number of the storage portions is the same as the number of the combinations of the transmission signal output portion and the wave transmitter. Due to the structure, in the configurations transmitting the plural transmission waves including the different identification informations from each other, the plural transmission signals serving as the bases of the plural transmission waves can be stored separately from each other.

In the first modified example, the receiving portion 620 includes a wave receiver 621, an amplifier circuit 622 and a filter processing portion 623. The functions and operations of these configurations are substantially similar to the functions and operations of the receiver 321, the amplifier circuit 322 and the filter processing portion 323 according to the above-described embodiment (refer to FIG. 4, for example), and therefore further explanation is omitted.

The receiving portion 620 of the first modified example includes plural of the configurations (each of which will be referred to as a signal processing system) each of which is similar to the configuration formed of the combination of the correlation processing portion 324, the envelope curve processing portion 325, the threshold value processing portion 326 and the detection portion 327 of the above-described embodiment (refer to FIG. 4, for example). The number of the signal processing systems is same as the number of the transmitting portions 610, 630, 650 (that is, three signal processing systems are provided).

That is, the receiving portion 620 of the first modified example includes a signal processing system A serving as a combination of a correlation processing portion 624A, an envelope curve processing portion 625A, a threshold value processing portion 626A and a detection portion 627A. The receiving portion 620 includes a signal processing system B serving as a combination of a correlation processing portion 624B, an envelope curve processing portion 625B, a threshold value processing portion 626B and a detection portion 627B. The receiving portion 620 includes a signal processing system C serving as a combination of a correlation processing portion 624C, an envelope curve processing portion 625C, a threshold value processing portion 626C and a detection portion 627C.

The signal processing system A (the correlation processing portion 624A of the signal processing system A) realizes various functions and operations on the basis of the transmission signal read out from the buffer 616 of the transmitting portion 610. In a similar manner, the signal processing system B (the correlation processing portion 624B of the signal processing system B) realizes various functions and operations on the basis of the transmission signal read out from the buffer 636 of the transmitting portion 630. In a similar manner, the signal processing system C (the correlation processing portion 624C of the signal processing system C) realizes various functions and operations on the basis of the transmission signal read out from the buffer 656 of the transmitting portion 650.

The specific functions and operations of the signal processing systems A to C are substantially similar to the functions and operations of the signal processing system according to the above-described embodiment (refer to FIG. 4, for example), and therefore further explanation is omitted. The drawing is a schematic diagram, however, each of the receiving portions 640 and 660 includes the configuration that is similar to the configuration of the receiving portion 620.

In the first modified example, the receiving portion 620 can obtain, at the same time, the three correlation values between the transmission signals serving as the bases of the transmission waves transmitted from the three transmitting portions 610, 630, 650 and the reception signals corresponding to the reception waves serving as the reflected waves of the transmission waves. In a similar manner, each of the receiving portions 640 and 660 can obtain the three correlation values at the same time. Thus, according to the first modified example, the distance to the object can be detected even more in detail by considering the different three kinds of information at the same time.

In the first modified example illustrated in FIG. 6, the combination of the wave transmitter 611 and the wave receiver 621 may be configured of the same vibrator or may be configured of the separate vibrators from each other, which is similar to the above-described embodiment. The same applies to the combination of the wave transmitter 631 and the wave receiver 641 and to the combination of the wave transmitter 651 and the wave receiver 661.

In the first modified example illustrated in FIG. 6, three each of the configurations of the transmitting-side and the configurations of the receiving-side are provided, and three of the signal processing systems are provided at each of the configurations of the receiving-side, however, the number "three (3)" does not include specific technical meaning. Accordingly, the number of these configurations may be two, or four or more than four.

The number of the configurations of the transmitting-side and the number of the configurations of the receiving-side do not need to coincide with each other. The number of the configurations of the transmitting-side and the number of the signal processing systems provided at each of the configurations of the receiving-side do not need to coincide with each other.

In the above-described embodiment, the configuration is described in which the combination of the code generation portion, the carrier wave output portion and the multiplier functions as the transmission signal output portion outputting, to the wave transmitter-side, the transmission signal serving as the basis of the transmission wave. However, the technique disclosed here is applicable also to a configuration in which the transmission signal output portion includes neither the carrier wave output portion nor the multiplier as illustrated in FIG. 7.

Figure 7:
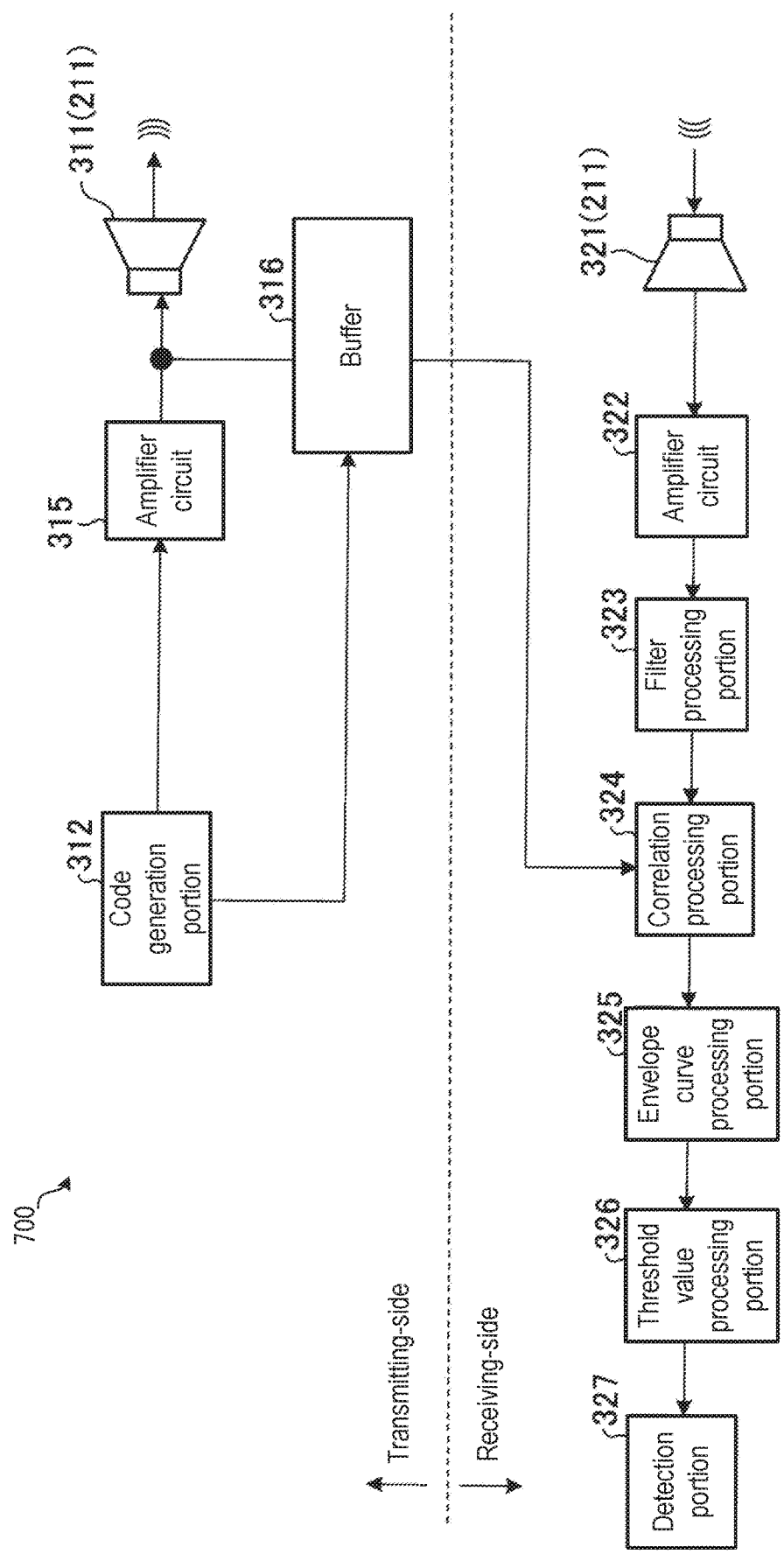
FIG. 7 is a schematic block diagram illustrating a detailed configuration of a distance detection apparatus according to a second modified example of the embodiment.

FIG. 7 is a schematic example block diagram illustrating a detailed configuration of a distance detection apparatus 700 according to a second modified example of the embodiment. As illustrated in FIG. 7, the distance detection apparatus 700 of the second modified example corresponds to the configuration of the distance detection apparatus 200 of the above-described embodiment (refer to FIG. 4) from which the carrier wave output portion 313 and the multiplier 314 are omitted.

That is, as illustrated in FIG. 7, the distance detection apparatus 700 of the second modified example includes the wave transmitter 311, the code generation portion 312, the amplifier circuit 315 and the buffer 316, as the configuration of the transmitting-side. According to the configuration, in the second modified example, the pulse signal outputted from the code generation portion 312 is inputted as it is, as the transmission signal, into the amplifier circuit 315. The transmission signal after amplification by the amplifier circuit 315 is stored at the buffer 316, and is also inputted into the wave transmitter 311 and the transmission wave corresponding to the amplified transmission signal is transmitted from the wave transmitter 311.

The other configuration of the distance detection apparatus 700 according to the second modified example is the same as the above-described embodiment (refer to FIG. 4), and therefore further explanation related to the configuration of the distance detection apparatus 700 is omitted.

Figure 8:
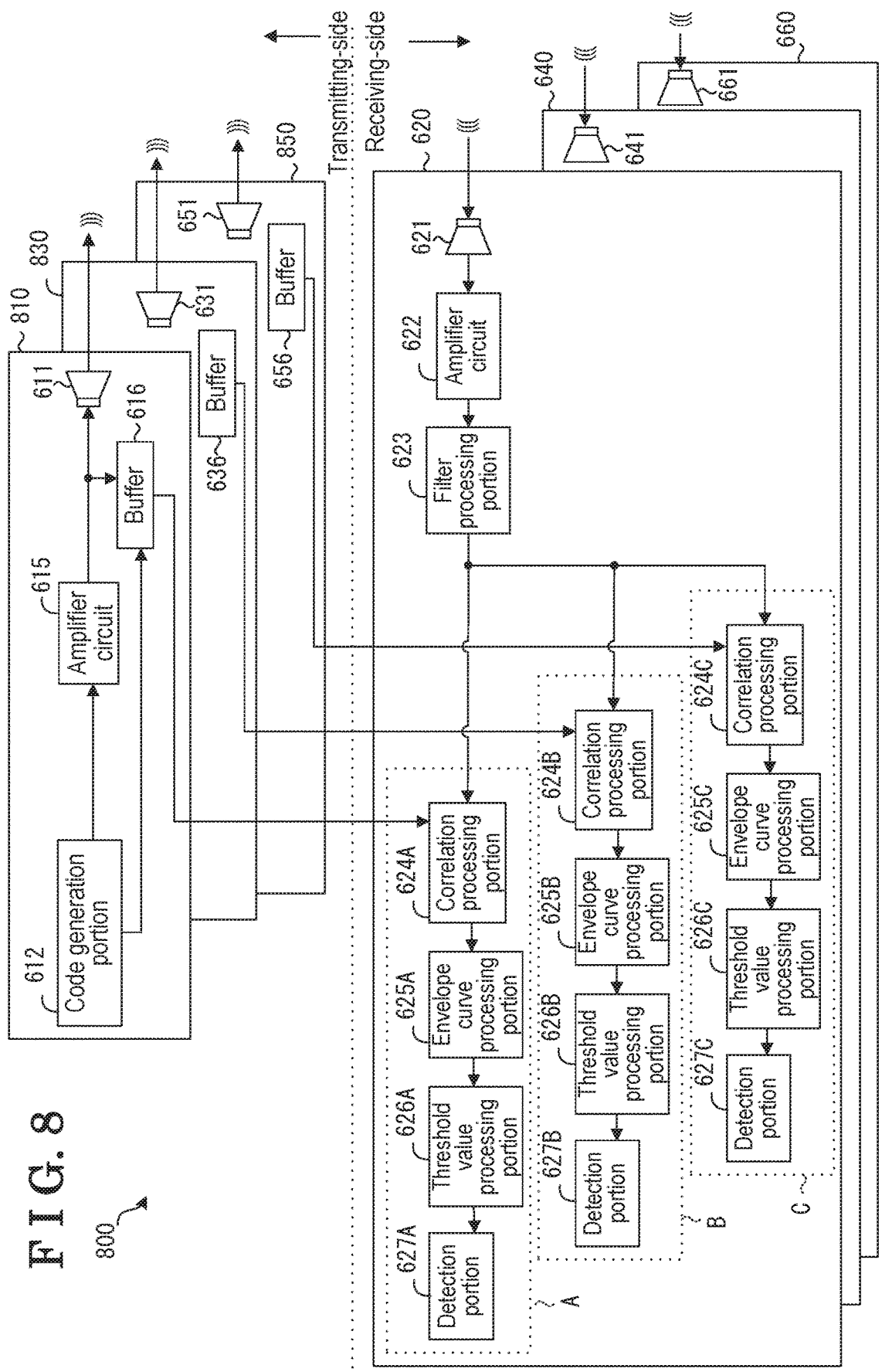
FIG. 8 is a schematic block diagram illustrating a detailed configuration of a distance detection system according to a third modified example of the embodiment.

As illustrated in FIG. 8, another modified example including a similar idea to the second modified example is applicable to the first modified example (refer to FIG. 6) to which the plural configurations of the transmitting-side and the plural configurations of the receiving-side are provided.

FIG. 8 is a schematic example block diagram illustrating a detailed configuration of a distance detection system 800 according to a third modified example of the embodiment. As illustrated in FIG. 8, the distance detection system 800 according to the third modified example corresponds to the configuration of the distance detection system 600 of the first modified example (refer to FIG. 6) from which the carrier wave output portion 613 and the multiplier 614 are omitted. The distance detection system 800 is an example of "the distance detection apparatus".

As illustrated in FIG. 8, a transmitting portion 810 of the distance detection system 800 of the third modified example includes the wave transmitter 611, the code generation portion 612, the amplifier circuit 615 and the buffer 616. According to the configuration, also in the third modified example, the pulse signal outputted from the code generation portion 612 is inputted as it is, as the transmission signal, into the amplifier circuit 615 in a similar manner to the second modified example. The transmission signal after amplification by the amplifier circuit 615 is stored at the buffer 616, and is also inputted into the wave transmitter 611 and the transmission wave corresponding to the amplified transmission signal is transmitted from the wave transmitter 611.

As described above, in the transmitting portion 810 according to the third modified example, the transmission signal output portion is configured only of the code generation portion 612. The same applies to another transmitting portion 830 and still another transmitting portion 850 of the third modified example.

The other configuration of the distance detection system 800 according to the third modified example is the same as the first modified example (refer to FIG. 6), and therefore further explanation related to the configuration of the distance detection system 800 is omitted.

As described above, according to the technique disclosed here, the transmission signal output portion may be configured only of the code generation portion instead of the combination of the code generation portion, the carrier wave output portion and the multiplier.

The above-described embodiment and the modified examples that are disclosed here are presented as examples and are not provided to intend to limit the scope of the disclosure. The embodiment and examples described above can be implemented in other various manners, and various omissions, substitutions and changes may be made without departing from the scope the disclosure. The embodiment and examples described above are included in the scope and/or subject matter of the disclosure, and included in the disclosure described in the scope of claims and in a range of equivalents thereof.

According to the aforementioned embodiment, a distance detection apparatus 200, 201, 202, 203, 204, 600, 700, 800 includes a wave transmitter 311, 611, 631, 651 configured to transmit a transmission wave corresponding to a transmission signal, a wave receiver 321, 621, 641, 661 configured to receive, as a reception wave, the transmission wave which is reflected by an obstacle (i.e., an object) O, a buffer (i.e., a storage portion) 316, 616, 636, 656 configured to store the transmission signal, a correlation processing portion 324, 624A, 624B, 624C configured to obtain a correlation value between the transmission signal read from the buffer 316, 616, 636, 656 and a reception signal corresponding to the reception wave, and a detection portion 327, 627A, 627B, 627C configured to detect a distance from the distance detection apparatus 200, 201, 202, 203, 204, 600, 700, 800 to the obstacle O on the basis of a difference between a timing t1 at which the transmission wave is transmitted and a timing t3 at which the reception signal is received, the detection portion 627, 627A, 627B, 627C detects the distance in a case where the correlation value indicates that the transmission signal and the reception signal are similar to each other at a level which is equal to or greater than a predetermined level.

According to the above-described configuration, the transmission signal is stored in the buffer 316, 616, 636, 656. Thus, the transmission signal read out from the buffer 316, 616, 636, 656 and the reception signal inputted in accordance with the reception wave are used as they are, and accordingly an accurate correlation value is obtained without the need to consider the tuning of the transmission signal and the reception signal to each other. Consequently, there is no need to provide, for example, the tuning circuit for tuning the transmission signal and the reception signal to each other, and thus the circuit configuration may be simplified.

According to the aforementioned embodiment, the distance detection apparatus 200, 201, 202, 203, 204, 600, 700, 800 includes an amplifier circuit 315, 615 configured to amplify the transmission signal and output the amplified transmission signal to the wave transmitter 311, 611, 631, 651, wherein the buffer 316, 616, 636, 656 stores the amplified transmission signal amplified by the amplifier circuit 315, 615.

According to the above-described configuration, unlike a case in which for example the transmission signal before the amplification is stored, the transmission signal before being transmitted as the transmission wave can be stored more accurately.

According to the aforementioned embodiment, the distance detection apparatus 200, 201, 202, 203, 204, 600, 700, 800 includes a transmission signal output portion 312, 313, 314, 612, 613, 614 configured to output the transmission signal to a side of the wave transmitter 311, 611, 631, 651, wherein in accordance with information obtained from the transmission signal output portion 312, 313, 314, 612, 613, 614 and related to a timing when the transmission signal is outputted, the buffer 316, 616, 636, 656 stores only portion of the amplified transmission signal, the portion corresponding to an output time period of the transmission signal.

According to the above-described configuration, even in a case where the amplification noise is added to the transmission signal, the transmission signal stored in the buffer 316, 616, 636, 656 as the grounds of the correlation value does not include the section corresponding to the amplification noise and includes only the section corresponding to the output time period. Consequently, the correlation value is obtained more accurately.

According to the aforementioned embodiment, the distance detection apparatus 200, 201, 202, 203, 204, 600, 700, 800 includes a transmission signal output portion 312, 313, 314, 612, 613, 614 configured to output the transmission signal to a side of the wave transmitter 311, 611, 631, 651, wherein the transmission signal output portion 312, 313, 314, 612, 613, 614 outputs a coded signal as the transmission signal. The coded signal is generated by adding identification information including a predetermined code length to a carrier wave.

According to the above-described configuration, distinguishability of the transmission signal may be enhanced due to the identification information.

According to the aforementioned embodiment, plural combinations of the transmission signal output portion 612, 613, 614 and the wave transmitter 311, 611, 631, 651 are provided, the identification information being different from each other between (or one another among) the combinations, and plural buffers 616, 636, 656 are provided, the number of the combinations and the number of the buffers (616, 636, 656) are same as each other.

According to the above-described configuration, in the configurations transmitting the plural transmission waves of which the identification informations differ from each other, the plural transmission signals serving as the bases of the plural transmission waves can be stored separately from each other.

According to the aforementioned embodiment, the wave transmitter 311, 611, 631, 651 and the wave receiver 321, 621, 641, 661 are configured integrally with each other as a transmitting and receiving portion 210 including a vibrator 211 configured to transmit and receive ultrasonic wave.

According to the above-described configuration, the configuration of the distance detection apparatus 200, 201, 202, 203, 204, 600, 700, 800 may be simplified.

According to the aforementioned embodiment, the storage portion 316, 616, 636, 656 is configured as a buffer 316, 616, 636, 656 storing the transmission signal temporarily.

According to the above-described configuration, the storage capacity can be reduced compared to a case in which, for example, the transmission signal is stored in a non-temporal manner.

According to the aforementioned embodiment, an object detection apparatus 200, 201, 202, 203, 204, 600, 700, 800 includes a wave transmitter 311, 611, 631, 651 configured to transmit a transmission wave corresponding to a transmission signal, a wave receiver 321, 621, 641, 661 configured to receive, as a reception wave, the transmission wave which is reflected by an obstacle (i.e., an object) O, a buffer (i.e., a storage portion) 316, 616, 636, 656 configured to store the transmission signal, a correlation processing portion 324, 624A, 624B, 624C configured to obtain a correlation value between the transmission signal read from the buffer 316, 616, 636, 656 and a reception signal corresponding to the reception wave, and a detection portion 627, 627A, 627B, 627C configured to detect information related to the obstacle O on the basis of the correlation value.

According to the above-described configuration, the transmission signal is stored in the buffer 316, 616, 636, 656. Thus, the transmission signal read out from the buffer 316, 616, 636, 656 and the reception signal inputted in accordance with the reception wave are used as they are, and accordingly an accurate correlation value is obtained without the need to consider the tuning of the transmission signal and the reception signal to each other. Consequently, there is no need to provide, for example, the tuning circuit for tuning the transmission signal and the reception signal to each other, and thus the circuit configuration may be simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A distance detection apparatus comprising:
a wave transmitter configured to transmit a transmission wave corresponding to a transmission signal;
a wave receiver configured to receive, as a reception wave, the transmission wave which is reflected by an object;
a storage portion configured to store the transmission signal;
a correlation processing portion configured to obtain a correlation value between the transmission signal read from the storage portion and a reception signal corresponding to the reception wave;
a detection portion configured to detect a distance from the distance detection apparatus to the object on the basis of a difference between a timing at which the transmission wave is transmitted and a timing at which the reception signal is received, the detection portion detects the distance in a case where the correlation value indicates that the transmission signal and the reception signal are similar to each other at a level which is equal to or greater than a predetermined level; and
an amplifier circuit configured to amplify the transmission signal and output the amplified transmission signal to the wave transmitter,
wherein the storage portion stores the amplified transmission signal amplified by the amplifier circuit.

2. The distance detection apparatus according to claim 1, further comprising:
a transmission signal output portion configured to output the transmission signal to the amplifier circuit, wherein
in accordance with information obtained from the transmission signal output portion and related to a timing when the transmission signal is outputted, the storage portion stores only a portion of the amplified transmission signal, the portion corresponding to an output time period of the transmission signal.

3. The distance detection apparatus according to claim 2, further comprising:
a transmission signal output portion configured to output the transmission signal to a side of the wave transmitter, wherein
the transmission signal output portion outputs a coded signal as the transmission signal, and the coded signal is generated by adding identification information including a predetermined code length to a carrier wave.

4. The distance detection apparatus according to claim 1, further comprising:
a transmission signal output portion configured to output the transmission signal to a side of the wave transmitter, wherein
the transmission signal output portion outputs a coded signal as the transmission signal, and the coded signal is generated by adding identification information including a predetermined code length to a carrier wave.

5. The distance detection apparatus according to claim 4, wherein
a plurality of combinations of the transmission signal output portion and the wave transmitter is provided, the identification information being different from each other between the combinations, and
a plurality of storage portions is provided, a number of the combinations and a number of the storage portions are same as each other.

6. The distance detection apparatus according to claim 1, wherein the wave transmitter and the wave receiver are configured integrally with each other as a transmitting and receiving portion including a vibrator configured to transmit and receive an ultrasonic wave.

7. The distance detection apparatus according to claim 1, wherein the storage portion is configured as a buffer storing the transmission signal temporarily.

8. An object detection apparatus comprising:

a wave transmitter configured to transmit a transmission wave corresponding to transmission signal;

a wave receiver configured to receive, as a reception wave, the transmission wave which is reflected by an object;

a storage portion configured to store the transmission signal;

a correlation processing portion configured to obtain a correlation value between the transmission signal read from the storage portion and a reception signal corresponding to the reception wave;

a detection portion configured to detect information related to the object on the basis of the correlation value; and an amplifier circuit configured to amplify the transmission signal and output the amplified transmission signal to the wave transmitter, wherein the storage portion stores the amplified transmission signal amplified by the amplifier circuit.

\* \* \* \* \*